United States Patent
Wu et al.

(10) Patent No.: US 11,252,299 B1
(45) Date of Patent: Feb. 15, 2022

(54) HIGH DYNAMIC RANGE COLOR CONVERSION USING SELECTIVE INTERPOLATION FOR DIFFERENT CURVES

(71) Applicant: Apple Inc., Cupertino, CA (US)

(72) Inventors: Chihsin Wu, San Jose, CA (US); David R. Pope, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/176,793

(22) Filed: Feb. 16, 2021

(51) Int. Cl.
*H04N 1/60* (2006.01)

(52) U.S. Cl.
CPC ......... *H04N 1/6025* (2013.01); *H04N 1/6058* (2013.01)

(58) Field of Classification Search
CPC ........................... H04N 1/6025; H04N 1/6058
See application file for complete search history.

(56) References Cited

U.S. PATENT DOCUMENTS

| | | |
|---|---|---|
| 2005/0206927 A1 | 9/2005 | Yamada |
| 2009/0122075 A1* | 5/2009 | Park ..................... G09G 3/2003 345/602 |
| 2017/0094098 A1 | 3/2017 | Manda |
| 2019/0279598 A1 | 9/2019 | Mito |

* cited by examiner

*Primary Examiner* — Christopher Wait
(74) *Attorney, Agent, or Firm* — Fenwick & West LLP

(57) ABSTRACT

Embodiments relate to pixel conversion of images for display. A circuit converts input pixel values of an image using a color conversion function. The circuit is operable in different modes where each mode uses a different color conversion function. A lookup table memory circuit stores a mapping of color converted values and input pixel values according to the mode of operation where the mapping represents the color conversion function associated with the mode. The circuit produces a color converted value from the lookup table as a color converted version of a first input pixel value responsive to the first input pixel value being within a first range. The circuit may also produce a color converted version of a second input pixel value by interpolating a subset of the color converted values received from the lookup table responsive to the second input pixel being within a second input range.

20 Claims, 16 Drawing Sheets

HIGH DYNAMIC RANGE COLOR CONVERSION USING SELECTIVE INTERPOLATION FOR DIFFERENT CURVES

BACKGROUND

1. Field of the Disclosure

The present disclosure relates a circuit for processing images and more specifically to color conversion using non-linear mapping.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

One of such operations performed by the image processing pipeline is conversion of image data in one format to HDR. To convert to HDR format, a color conversion function may be used to convert pixel data to a particular brightness.

SUMMARY

Embodiments relate to circuitry for converting input image pixel values of images into output image pixel values using a color conversion function. A circuit may operate in different operation modes where each operation mode uses a different color conversion function for color conversion of input image pixel values to output image pixel values. The color conversion function is divided into two regions with a first region including first input pixel conversion values and corresponding first output pixel conversion values, and a second region including second input pixel conversion values and corresponding second output pixel conversion values. The circuitry may convert an input image pixel value in the first region by fetching from a lookup table an output pixel conversion value indexed to the first input image pixel value in the lookup table and apply the fetched output pixel conversion value to the input image pixel value. In contrast, the circuitry performs linear interpolation to calculate a converted output image pixel value for an input image pixel value in the second region. Using the lookup table or linear interpolation to perform color conversion dependent on whether the input image pixel value is in the first region or second region preserves high precision of accuracy while reducing power consumption.

Figure 1:
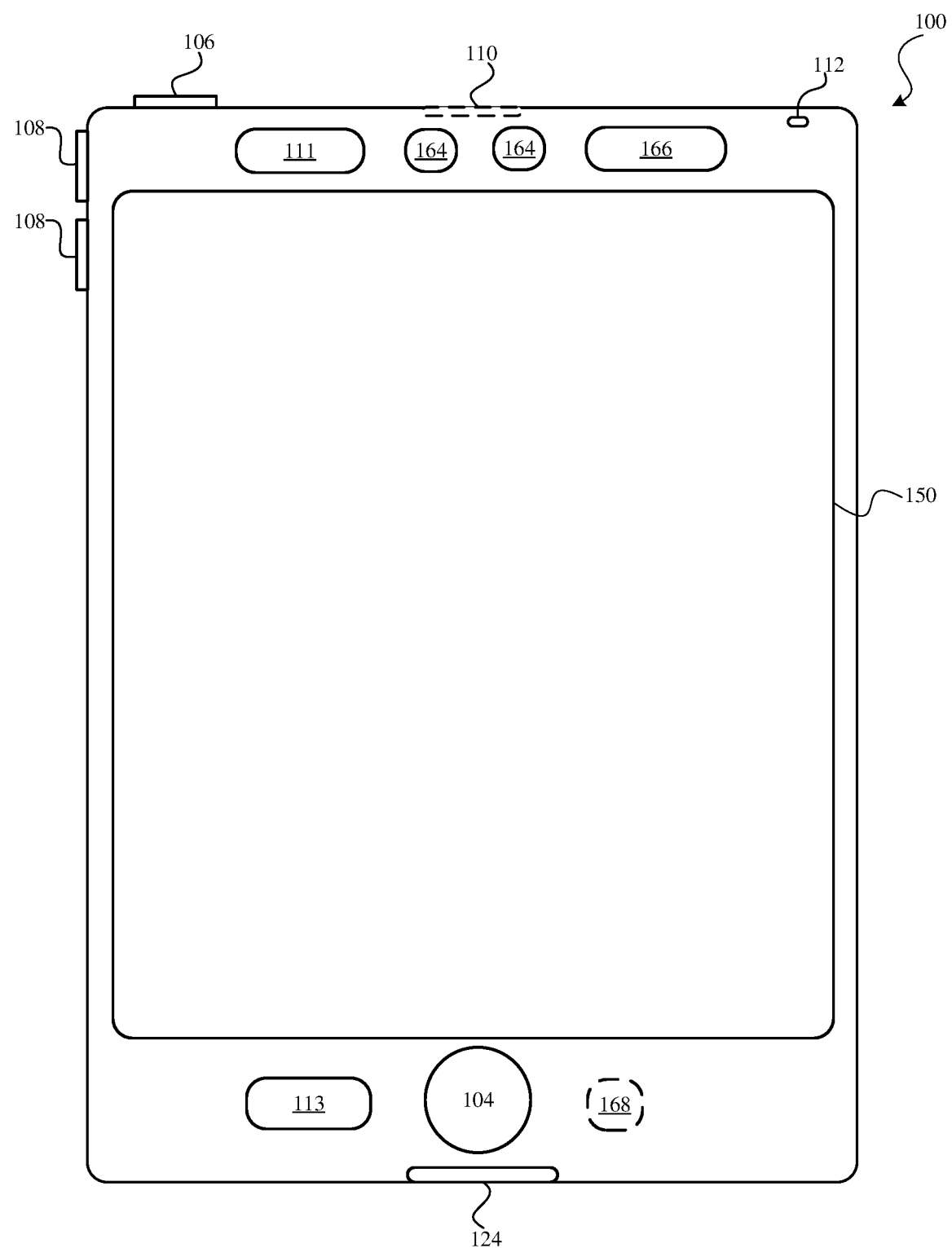
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circuit for converting input image pixel values into output image pixel values of high dynamic range (HDR) format using a color conversion function. The circuit operates in at least two operation modes where each operation mode uses a different color conversion function to perform HDR color conversion. A look-up table is configurable to store values corresponding to the selected color conversion function. In a first region of the color conversion function, the look-up table may index different color components of each pixel. But in the second region of the color conversion function, the look-up table stores output pixel conversion values for only a portion of all possible input pixel conversion values in the second region of the color conversion function rather than for all possible input pixel conversion values in the second region. The circuit can calculate a converted output image pixel value for an input pixel image value in the second region using linear interpolation. In this way, more accurate color converted values can be obtained in the first region while providing reasonably accurate color converted values in the second region without significantly increasing memory of the circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
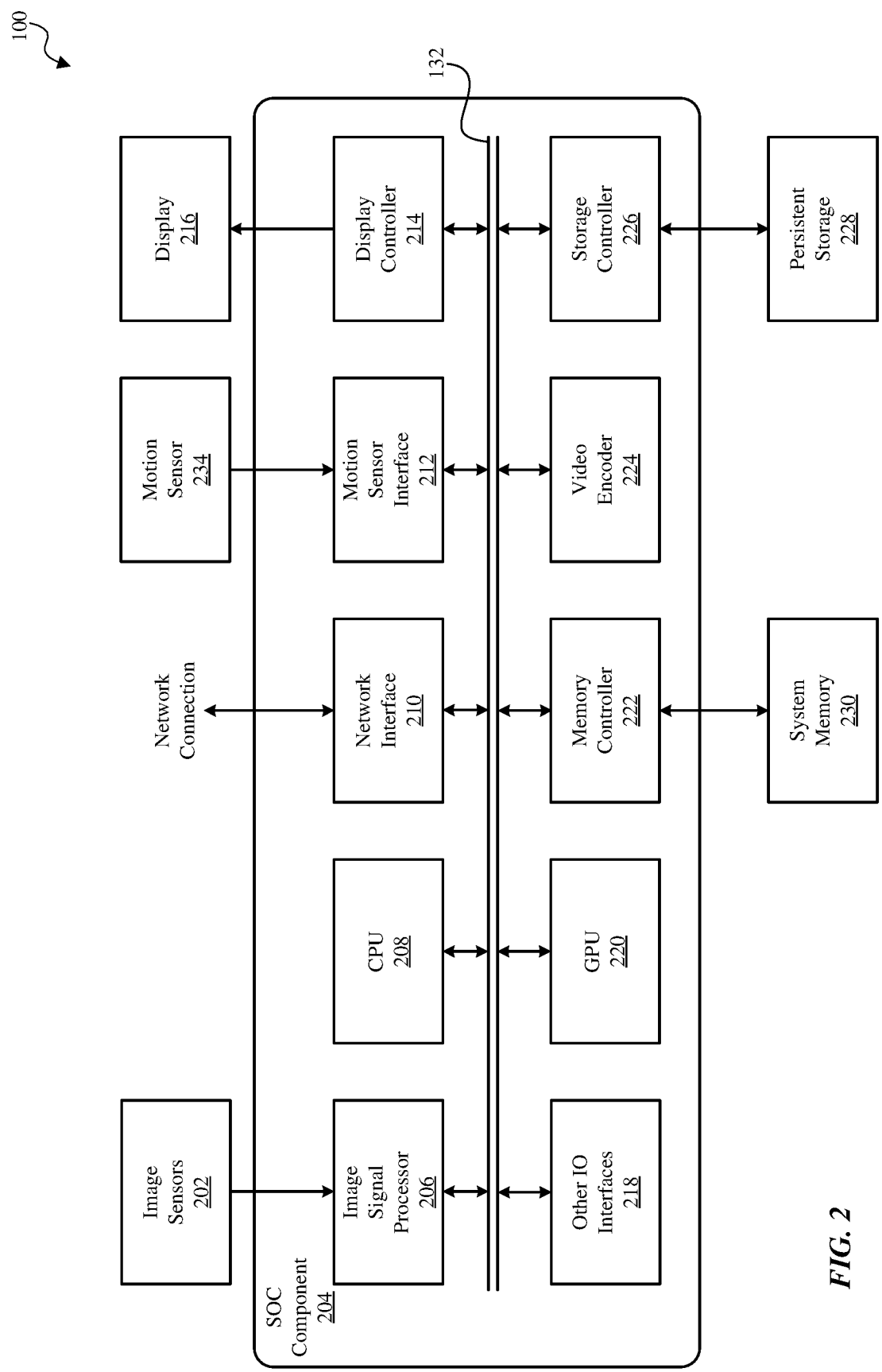
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
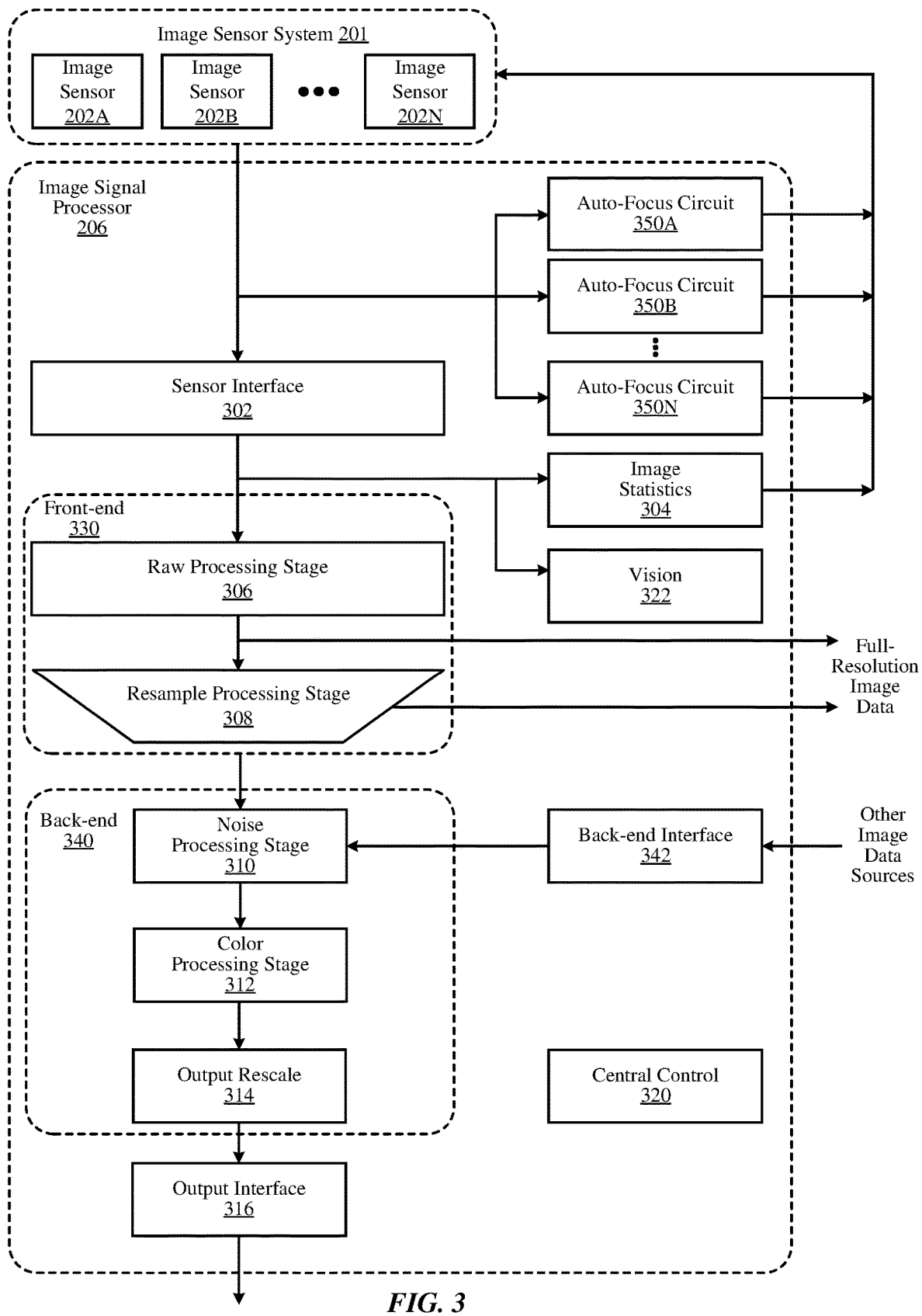
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Architecture of Color Processing Stage 312

Figure 4:
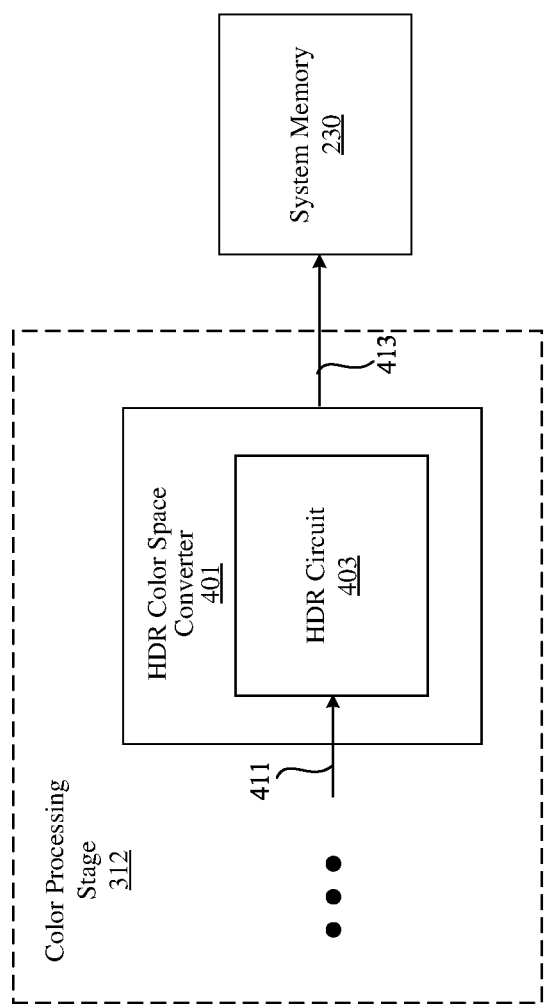
FIG. 4 is a block diagram of a high dynamic range (HDR) color space converter, according to one embodiment.

FIG. 4 is a block diagram of the color processing stage 312 according to one embodiment. As mentioned above with reference to FIG. 3, the color processing stage 312 performs various operations associated with adjusting color information in image data. The operations for adjusting color information in image data include a color space conversion to convert image data from one color space to another.

In one embodiment, the color processing stage 312 includes an HDR color space converter 401. The HDR color space converter 401 converts image data from a non-HDR color space to an HDR color space. In particular, the HDR color space converter 401 includes an HDR circuit 403 that receives image data 411 and converts the image data 411 from one color space to an HDR color space. That is, the HDR circuit 403 converts pixel values of the image data 411 (e.g., the input image pixel values) into output image pixel values 413 that are in an HDR color space. The output image pixel values 413 can be stored in the system memory 230 for further processing and/or display on display 216.

The HDR circuit 403 converts the pixel values of the image data 411 using a color conversion function that is selected from multiple different types of color conversion functions. Each type of color conversion function has different mappings of input image pixel values from the image data 411 to output pixel conversion values for HDR format.

Figure 5:
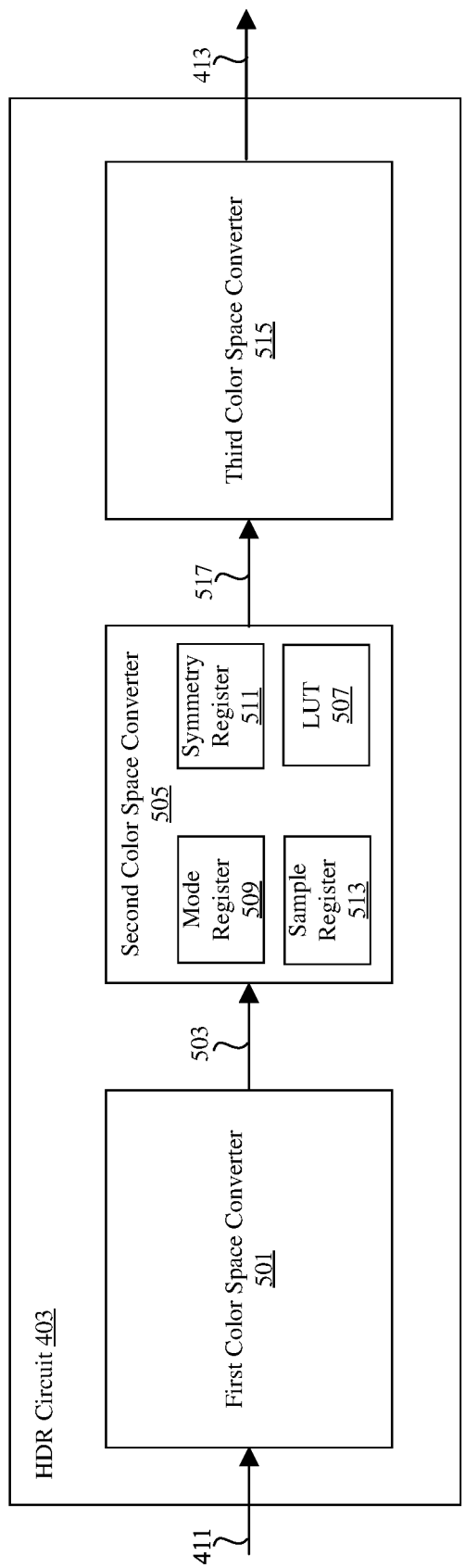
FIG. 5 is a detailed block diagram of an HDR circuit, according to one embodiment.

FIG. 5 is a detailed block diagram of the HDR circuit 403, according to one embodiment. The HDR circuit 403 includes, among other components, a first color space converter 501, a second color space converter 505, and a third color space converter 515. The first color space converter 501 receives the image data 411. The image data 411 may be in a YCbCr color format or other non-HDR formats. The first color space converter 601 converts the image data 411 into a different color space. In one embodiment, the first color space converter 501 converts the image data 411 in the YCbCr color format to the LMS color space. The first color space converter 501 may first convert the image data 411 in YCbCr color format to the RGB color space and then convert the merged fused image data in the RGB color space to the LMS color space. The first color space converter 501 outputs the converted image data 503 in the LMS color space to the second color space converter 505. The second color space converter 505 converts the converted image data 503 according to a color conversion function. The color conversion function used for HDR color conversion is dependent on the operation mode of the HDR circuit 403.

The second color space converter 505 may include, among other components, a mode register 509 that defines an operation mode of the HDR circuit 403, a symmetry register 511 that specifies whether the color conversion function used in the operation mode of the HDR circuit 403 includes symmetry, a sample register 513 that defines the number of sample points in different regions of the color conversion function, and a look up table (LUT) 507 that stores a mapping of input pixel conversion values and output pixel conversion values for the color conversion function used in the mode of operation specified in the mode register 509, as will be described in further detail below. Note that in other embodiments, the second color space converter 505 may include other components than shown in FIG. 5.

The mode register 509 stores a mode value that defines an operation mode of the HDR circuit 403. The HDR circuit 403 may operate in one of a plurality of different operation modes where each operation mode uses a corresponding color conversion function to perform HDR color conversion. For example, a mode value of "1" places the HDR circuit 403 in a first operation mode that uses a first type of color conversion function for HDR color conversion, a mode value of "2" places the HDR circuit 403 in a second operation mode that uses a second type of color conversion function for HDR color conversion, a mode value of "3" places the HDR circuit 403 in a third operation mode that uses a third type of color conversion function for HDR color conversion, and a mode value of "4" places the HDR circuit 403 in a fourth operation mode that uses a second type of color conversion function for HDR color conversion.

The HDR circuit 403 may operate in one of four different operation modes where each operation mode uses a different type of color conversion function from a plurality of different types color conversion functions that are available to perform HDR color conversion as described below. While the embodiments described herein use four different types color conversion functions, any number of color conversion functions may be available for HDR color conversion.

Figure 6A:
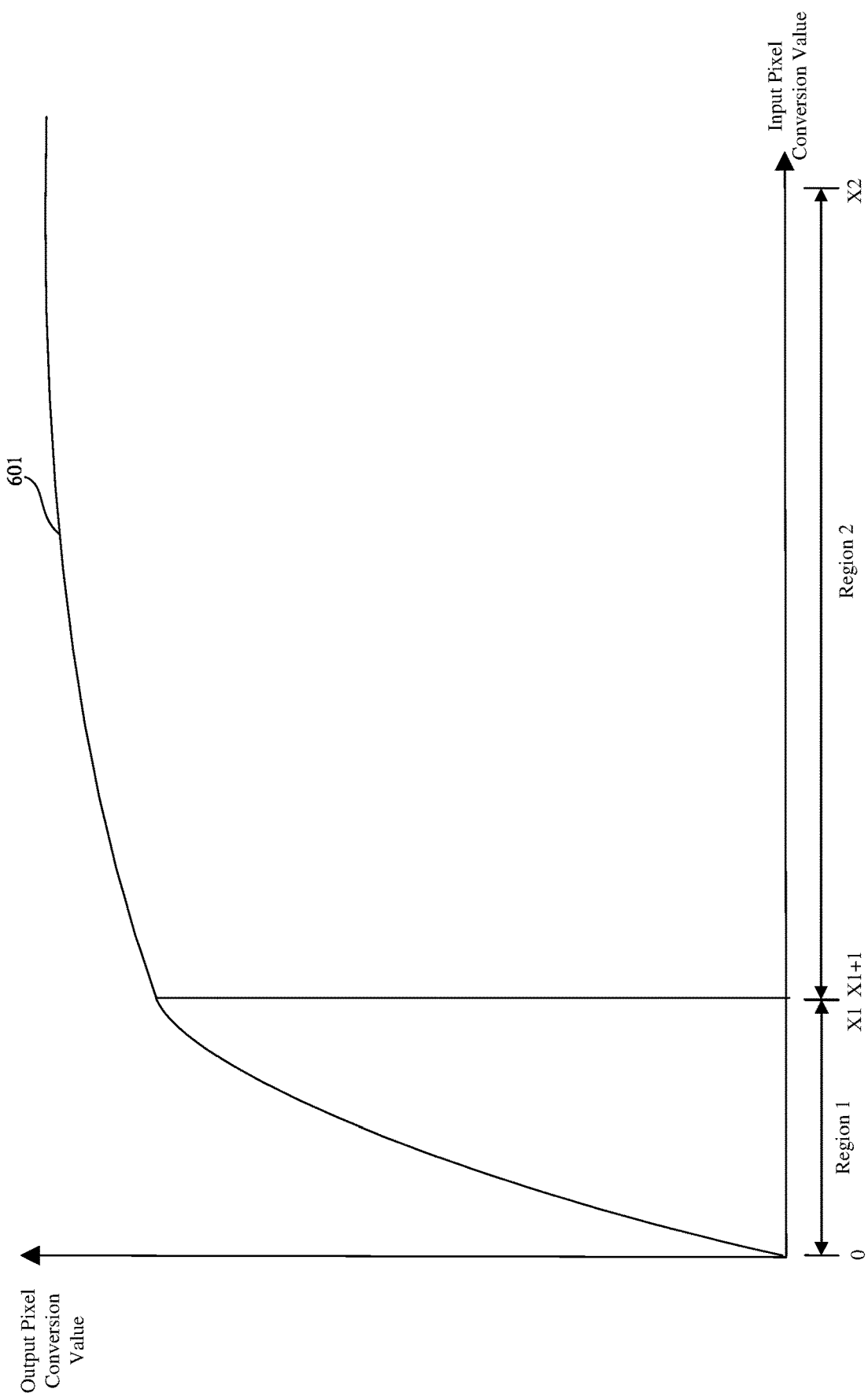
FIGS. 6A, 6B, and 6C are diagrams of a first type of color conversion function, according to one embodiment.

FIG. 6A is an example of a first type of color conversion function 601 used in a first operation mode of the HDR circuit 403 according to one embodiment. The first type of color conversion function 601 is characterized as having a steep portion of the curve closest to zero. Examples of the first type of color conversion function 601 include a gamma function, log 2 function, and a power function with an exponent less than 1.

In one embodiment, the X-axis of the first type of color conversion function 601 represents the input pixel conversion values that correspond to input image pixel values of the image data 503 in the LMS color space. The Y-axis of the first type of color conversion function 601 represents the output pixel conversion values (e.g., color converted values) where each output pixel conversion value corresponds to one input pixel conversion value. The output pixel conversion values of the first type of color conversion function 601 are applied to the input pixel values of an image to convert the input pixel values into color converted versions of the input pixel values for further processing or displaying on display 100.

Generally, the input pixel conversion values of all of the different color conversion functions are grouped into two regions: Region 1 and Region 2. Region 1 (e.g., a first input range) of the color conversion function is applied to convert input image pixel values from zero signal to input image pixel value X1 into their corresponding output pixel conversion value. Region 2 (e.g., a second input range) of the color conversion function is used to convert input image pixel values X1+1 to X2 into their corresponding output pixel conversion value.

The input image pixel values in Region 1 of the first type of color conversion function 601 can cause distortion when input image pixel values in Region 1 are converted using linear interpolation due to the steepness of the first type of color conversion function 601 in Region 1. To address the issue, the lookup table (LUT) 507 stores output pixel conversion values for each and every input pixel conversion value in Region 1. Thus, Region 1 typically has denser sampling points (e.g., a greater number of sampling points) in the LUT 507 compared to the number of sampling points for Region 2 in the LUT 507. In one embodiment, the LUT 507 is embodied as a memory circuit.

In one embodiment, the LUT 507 stores a mapping of output pixel conversion values for all input image pixel values in Region 1 of the first type of color conversion function 601. For each pixel in the converted image data 503 having an input image pixel value in Region 1 of the color conversion function, the second color space converter 505 accesses the LUT 507 to identify the output pixel conversion value that maps to the input image pixel value of the image. The output pixel conversion value that maps to the input image pixel value is a color converted version of the input image pixel value. Note that the LUT 507 may have multiple conversion tables for the different color components in the LMS color space if the L, M, S components have different color conversion functions. That is, the LUT 507 may have a conversion table for the "L" component, the "M" component, and the "S" component of the converted image data 503, respectively. In another embodiment, the LUT 507 has a single conversion table for the L, M, and S components if the color conversion function for the L, M, and S components are the same.

In one embodiment, the LUT 507 also stores output pixel conversion values for input image pixel values in Region 2 of the first type of color conversion function 601. However, unlike for Region 1 of the first type of color conversion function 601, the LUT 507 stores output pixel conversion values for a subset of all possible input pixel conversion values in Region 2 of the first type of color conversion function 601. The portion of the LUT 507 corresponding to Region 2 of the first type of color conversion function 601 may have input pixel conversion values spaced apart by a power of two and their corresponding output pixel conversion values. That is, adjacent ones of the subset of input pixel values in Region 2 have intervals of power of two. In contrast, LUT 507 stores for Region 1 of the color conversion function each input pixel conversion value in Region 1 and its corresponding output pixel conversion value as described above.

In one embodiment, the set of output pixel conversion values that are stored in LUT 507 are dependent on the operation mode of the HDR circuit 403. As mentioned above, each operation mode of the HDR circuit 403 uses a different color conversion function to perform HDR color conversion. Accordingly, each operation mode of the HDR circuit 403 uses a unique set of output pixel conversion values that is associated with the color conversion function that corresponds to the operation mode. The unique set of output pixel conversion values that is loaded into the LUT 507 is based on the operation mode of the HDR circuit 403.

Referring back to FIG. 5, the second color space converter 505 further includes a sample register 513 according to one embodiment. The sample register 513 stores values defining the number of sample points (e.g., input pixel conversion values and output pixel conversion values) that are included in each of Region 1 and Region 2 of the color conversion function used in the operation mode of the HDR circuit 403. In one embodiment, the total number of sample points that are included in Region 1 and Region 2 are the same for all of the different modes of the HDR circuit 403. For example, the LUT 507 may store a total of 257 sample points across Region 1 and Region 2 for each color conversion function. However, any number of sample points may be stored in other embodiments.

Generally, the total number of sample points included in Region 1 is configurable. In one embodiment, the total amount of sample points included in Region 1 is less than the total number of sample points included in Region 2. However, in other embodiments the total number of sample points included in Region 1 is more than the total number of sample points included in Region 2. Region 1 may include any number of sample points that satisfy all possible input pixel conversion values in Region 1 of the color conversion function given that Region 1 is associated with the steepest portion of the color conversion function. In one embodiment, Region 1 may have n points where n is a positive natural number.

Region 2 in contrast is divided into multiple sub-regions. Each sub-region in Region 2 may have the same number of sample points or a different number of sample points as the remaining sub-regions. In one embodiment, Region 2 is divided into multiple sub-regions using a non-uniform integer function.

Figure 6B:
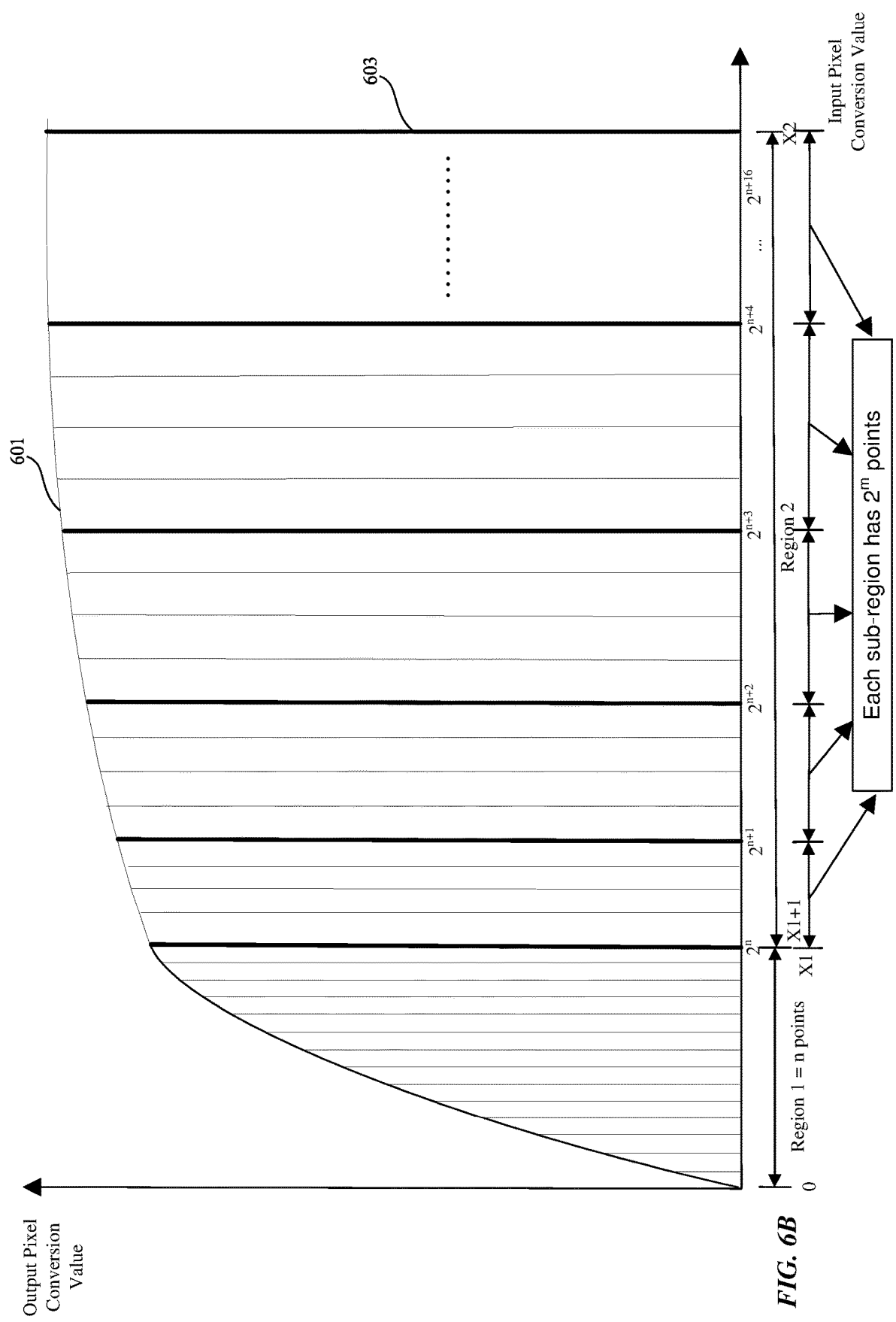

FIG. 6B illustrates the number of sample points in Region 1 and Region 2 of the first color conversion function 601. As shown in FIG. 6B, Region 1 may have n points of input pixel conversion values and output pixel conversion values where n is a positive natural number. In contrast, the sub-regions of Region 2 are divided using a power function (e.g., power of 2). The first sub-region of Region 2 is between points $2^n$ and $2^{n+1}$, the second sub-region of Region 2 is between points $2^{n+1}$ and $2^{n+2}$, the third sub region of Region 2 is between points $2^{n+2}$ and $2^{n+3}$ and so on. As shown in FIG. 6B, each sub-region in Region 2 has the same number of sample points. In this example, each sub-region has $2^m$ sample points where m is four. However, m can any natural number greater than zero.

Furthermore, in other embodiments the number of sample points in each sub-region is configurable such that the number of sample points in each sub-region are different from each other. For example, the first sub-region in Region 2 may have two sample points whereas the second sub-region in Region 2 may have four sample points.

For each pixel in the converted image data 503 having an input image pixel value in Region 2 of the color conversion function, the second color space converter 505 accesses the LUT 507 to identify whether the LUT 507 includes an output pixel conversion value that corresponds to the input image pixel value. Responsive to the LUT 507 storing an output pixel conversion value that corresponds to the input image pixel value in Region 2, the second color space converter 505 performs the necessary conversion by fetching the output pixel conversion value that corresponds to the input image pixel value from the LUT 607.

However, if the LUT 507 does not store an output pixel conversion value for the input image pixel value from Region 2 of the color conversion function, additional interpolation is required. Thus, the second color space converter 505 performs interpolation to determine the output pixel conversion value, as described below in detail with respect to FIG. 6C. The interpolation function described with respect to FIG. 6C is applicable to the other types of color conversion functions described herein.

Figure 6C:
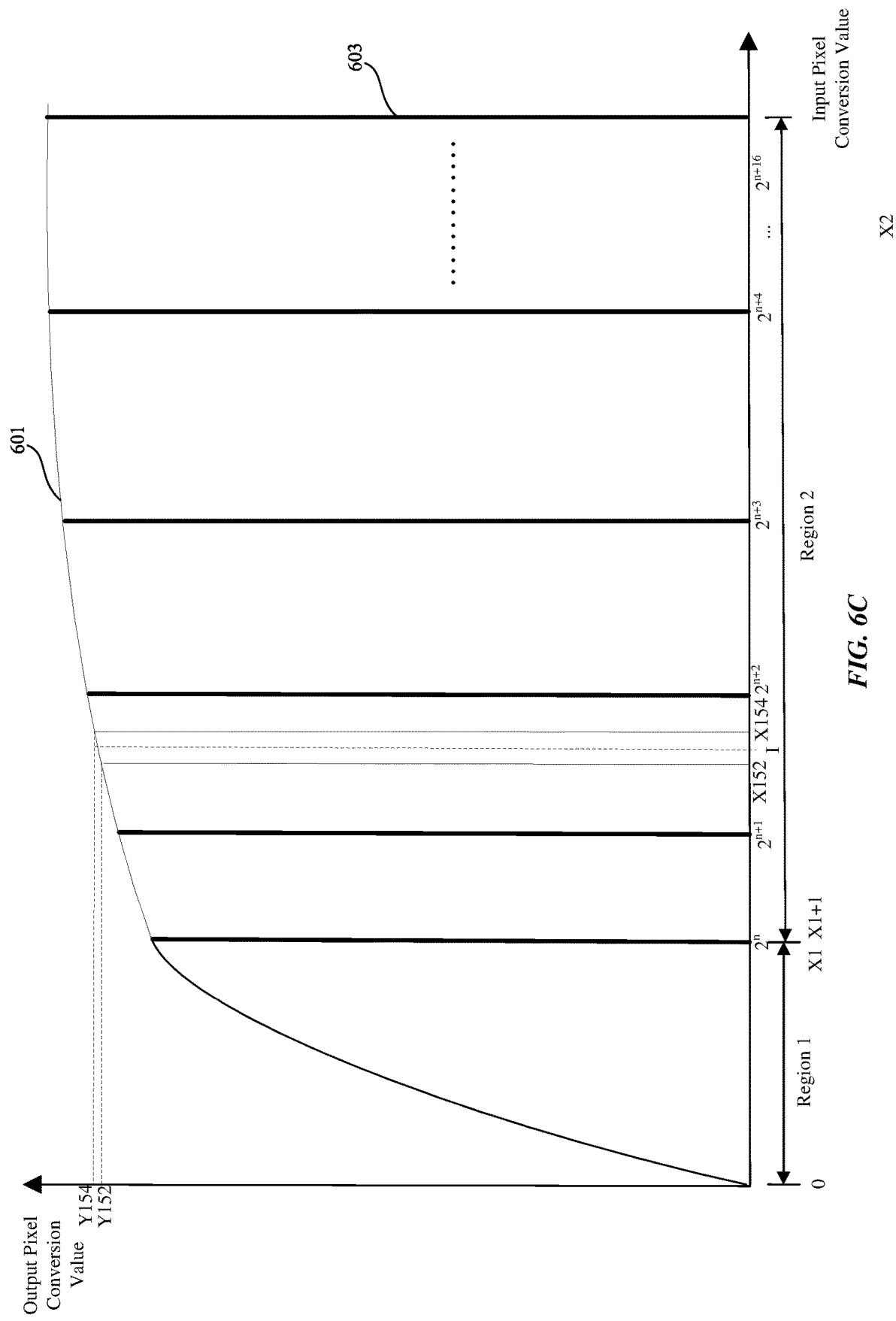

In the example shown in FIG. 6C that uses the first type of color conversion function 601, the second color space converter 505 received an image 503 with an input image pixel value I that is within Region 2 of the color conversion function. Given that an output pixel conversion value for input image pixel value I is not stored within LUT 507, the second color space converter 505 performs linear interpolation to determine the corresponding output pixel conversion value for input image pixel value I.

To perform linear interpolation, the second color space converter 505 first identifies the sub-region of Region 2 that includes the input image pixel value I. The second color space converter 505 then identifies two input pixel conversion values stored in the LUT 507 that bound the input image pixel value I within the sub-region of Region 2. One of the two input pixel conversion values has a higher value than the other of the two input pixel conversion values. In this example, the second color space converter 505 determines that the input image pixel value I is in the sub-region between points $2^{n+1}$ and $2^{n+2}$ in Region 2. The second color space converter 505 then determines that the input image pixel value I is between input pixel conversion values X152 and X154 in the identified sub-region and retrieves their corresponding output pixel conversion values Y152 and Y154. Then, the second color space converter 505 performs linear interpolation using the two input pixel conversion values X152 and X154 and their corresponding output pixel conversion values Y152 and Y154 to determine the output pixel conversion value for input image pixel value I (e.g., the color converted version of input image pixel value I). Since all intervals in Region 2 are a power of two, the second color space converter 505 can use a simple shift operation for the linear interpolation for any in-between points thereby avoiding using general division which is computationally more expensive.

As mentioned above, Region 1 may have n points where n is a positive natural number. As a result, the total number of points in Region 1 of a color conversion function may not be a power of two thereby resulting in the last interval in the color conversion function not ending in a point that is a power of two. This scenario would require using general division to perform linear interpolation for any points that are in-between input pixel conversion values rather than using the simple shift operation for the linear interpolation. Accordingly, in one embodiment a configurable dummy point 603 may be added as the last point in the color conversion function to make all intervals of the color conversion function a power of two. Thus, the second color space converter 505 can use the simple shift operation for the linear interpolation for any in-between points.

Figure 7A:
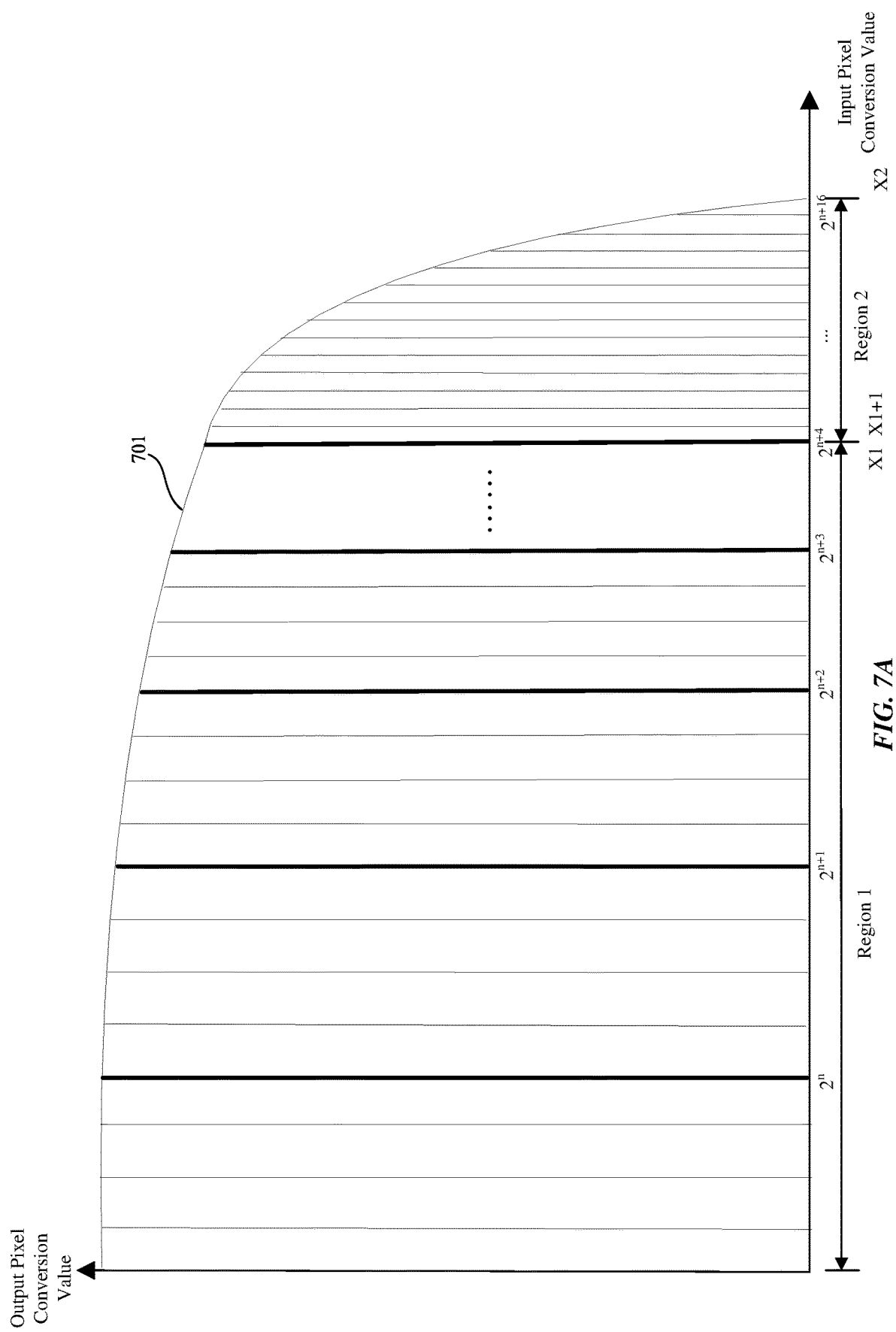
FIGS. 7A and 7B are diagrams of a second type of color conversion function, according to one embodiment.

As mentioned above, the HDR circuit 403 operates in different operation modes where each mode is associated with a different type of color conversion function. FIG. 7A illustrates a second type of color conversion function 701 that can be used for HDR color conversion in a second operation mode of the HDR circuit 403. The second type of color conversion function 701 is characterized as having values that are arranged from sparse to dense. That is, Region 1 of the second type of color conversion function 701 has less values than Region 2 since Region 2 of the second type of color conversion function 701 is the steepest region of the curve.

As shown in FIG. 7A, the second type of color conversion function 701 is a mirror image of the first type of color conversion function 601 shown in FIG. 6 with respect to an offset point along the X axis such that the points of the second type of color conversion function 701 are arranged in a sparse to dense manner such that the sparse points are included in Region 1 and the dense points are arranged in Region 2. In contrast, the points of the first type of color conversion function 601 are arranged in a dense to sparse arrangement such that the dense points are included in Region 1 and the sparse points are arranged in Region 2. In one embodiment, the second color space converter 505 transforms the second type of color conversion function 701 using the mapping values for the first type of color conversion function 601 so that the dense points of the second type of color conversion function 701 are included in Region 1 and the sparse points of the second type of color conversion function 701 are included in Region 2.

Figure 7B:
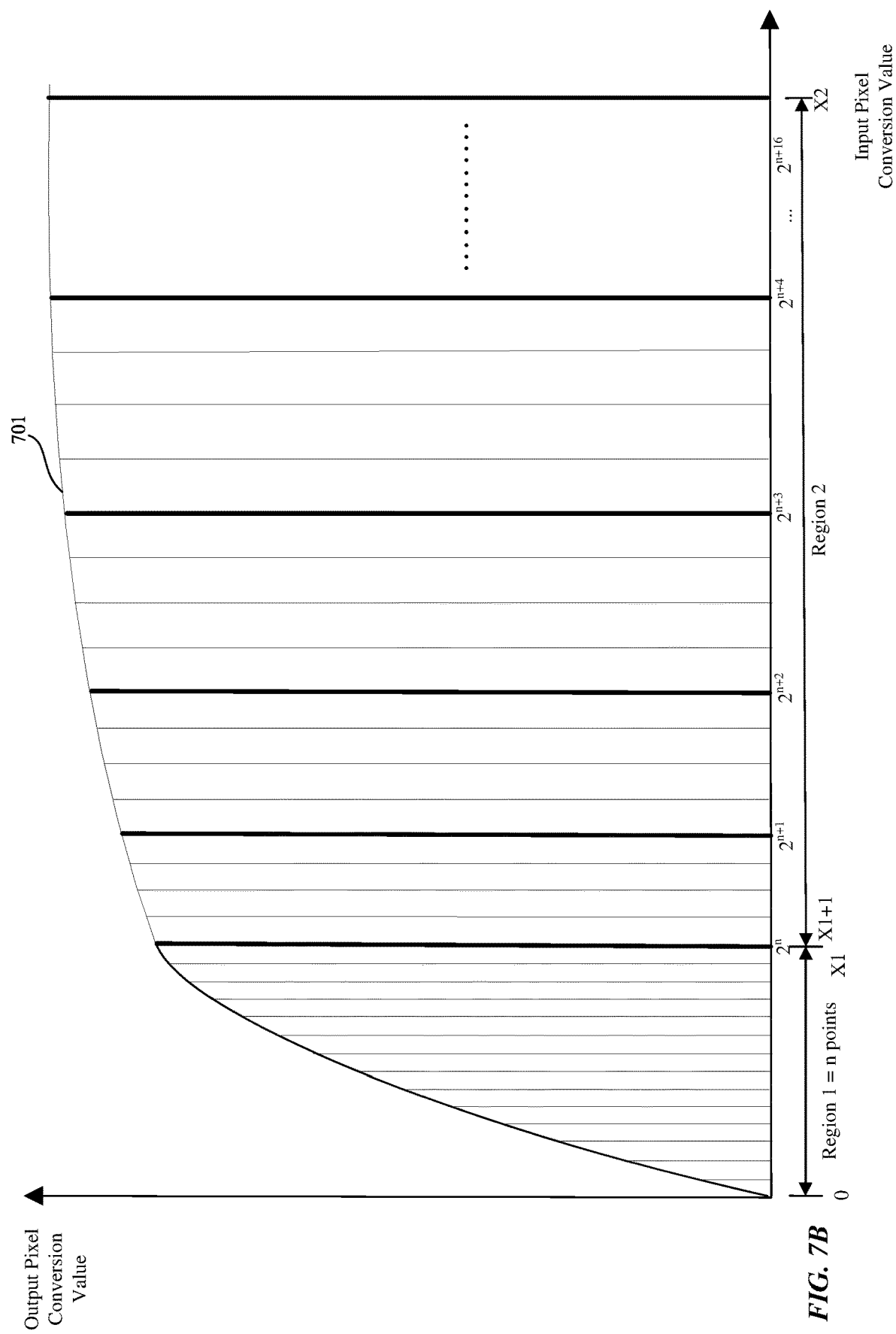

To generate the mapping values for the second type of color conversion function 701 using the mapping values for the first type of color conversion function 601, the second color space converter 505 performs coordinate translation on the mapping values for the first type of color conversion function 601. For example, the second color space converter replaces the first value in the mapping values for the first type of color conversion function 601 with the last value in the mapping values for the first type of color conversion function 601, replaces the second value in the mapping values for the first type of color conversion function 601 with the second to last value in the mapping values for the first type of color conversion function 601, replaces the third value in the mapping values for the first type of color conversion function 601 with the third to last value in the mapping values for the first type of color conversion function, and so on. The generated mapping values for the second type of color conversion function 701 are stored for later programming into the LUT 507 when the HDR circuit 403 is in the second operation mode. The transformed second type of color conversion function 701 shown in FIG. 7B now resembles the first type of color conversion function 601 in that Region 1 now has the densest distribution of sample points compared to Region 2 which has the sparsest distribution of sample points.

In one embodiment, the second color space converter 505 performs color conversion during the second operation mode of the HDR circuit 403 in the same manner as described above with respect to the first operation mode of the HDR circuit 403. That is, for each pixel in the converted image data 503 having an input image pixel value in Region 1 of the second type of color conversion function 701, the second color space converter 505 accesses the LUT 507 to identify the output pixel conversion value that maps to the input image pixel value of the image. For each pixel in the converted image data 503 having an input image pixel value in Region 2 of the second type of color conversion function 701, the second color space converter 505 accesses the LUT 507 to identify whether the LUT 507 includes an output pixel conversion value that corresponds to the input image pixel value. Responsive to the LUT 507 storing an output pixel conversion value that corresponds to the input image pixel value in Region 2, the second color space converter 505 performs the necessary conversion by fetching the output pixel conversion value that corresponds to the input image pixel value from the LUT 507. However, if the LUT 507 does not store an output pixel conversion value for the input image pixel value from Region 2 of the second type of color conversion function 701, the second color space converter 505 performs linear interpolation as described above.

Referring back to FIG. 5, the symmetry register 511 stores a symmetry value that indicates a type of symmetry present in the color conversion function used in an operation mode of the HDR circuit 403. In one embodiment, a first symmetry value indicates a color conversion function is symmetric about an origin of offset in the X-direction whereas a second symmetry value indicates that the color conversion function is symmetric about s point in the X and Y-directions. If a color conversion function has a property of symmetry, the LUT 507 only needs to be programmed with half of the mapping for the color conversion function since the remaining mapping values of the color conversion function is a mirror image of the mapping values stored in the LUT 507. Thus, the remaining half of the mapping values of the color conversion function may be expanded (e.g., derived) from the mapping values stored in the LUT 507.

Figure 8A:
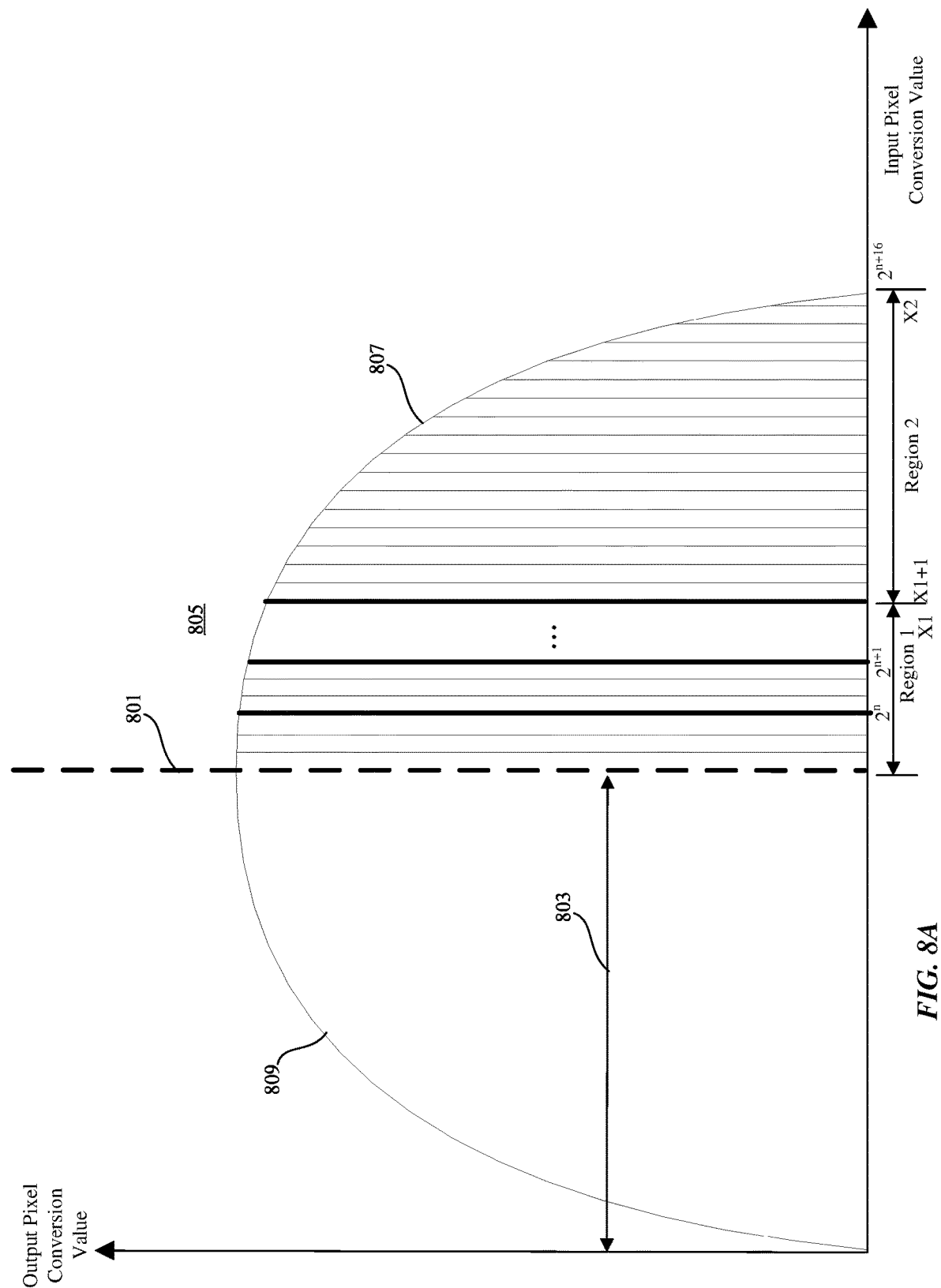
FIGS. 8A and 8B are diagrams of a third type of color conversion function, according to one embodiment.

FIG. 8A illustrates a third type of color conversion function 805 used in a third operation mode of the HDR circuit 403 for HDR color conversion. The third type of color conversion function 805 is characterized as having output pixel conversion values that are symmetrical about an origin of offset in the X-direction. An example of the third type of color conversion function 805 is a bell-shape curve or inverse S-curve.

As shown in FIG. 8A, the third type of color conversion function 805 is symmetrical across an input offset point 801. The input offset point 801 is offset 803 from zero in the X-direction. In one embodiment, third type of color conversion function 805 includes a first portion 807 to the right of the input offset point 801 and a second portion 809 to the left of the input offset point 801. In the third operation mode of the HDR circuit 403, only the input pixel conversion values and the output pixel conversion values of the first portion 807 are programmed in LUT 507 as will be described below.

The first portion 807 of the third type of color conversion function 805 is similar in shape to the second type of color conversion function 701. That is, the output pixel correction values of the first portion 807 of the third type of color conversion function 805 have the densest number of points in Region 2 instead of in Region 1. Accordingly, the first portion 807 of the third type of color conversion function 805 is transformed by the second color space converter 505 so that the output pixel conversion values of the transformed portion 807 have dense to sparse properties similar to the first type of color conversion function 601.

To transform the output pixel conversion values for the first portion 807 of the third type of color conversion function 805, the second color space converter 505 stores in the LUT 507 the last value of the output pixel conversion values for the third type of color conversion function 805 as the first value in the mapping values for the third type of color conversion function 805, the second to last output pixel conversion value in the set of output pixel conversion values for the third type of color conversion function 805 as the second value in the mapping values for the third type of color conversion function 805, the third to last value in the set of output pixel conversion values for the third type of color conversion function 805 as the third value in the mapping values for the third type of color conversion function 805, and so on. The transformed third type of color conversion function 805 shown in FIG. 8B now resembles the first type of color conversion function 601 in that Region 1 has the densest distribution of sampling points compared to Region 2 which has the sparsest distribution of sampling points.

Figure 8B:
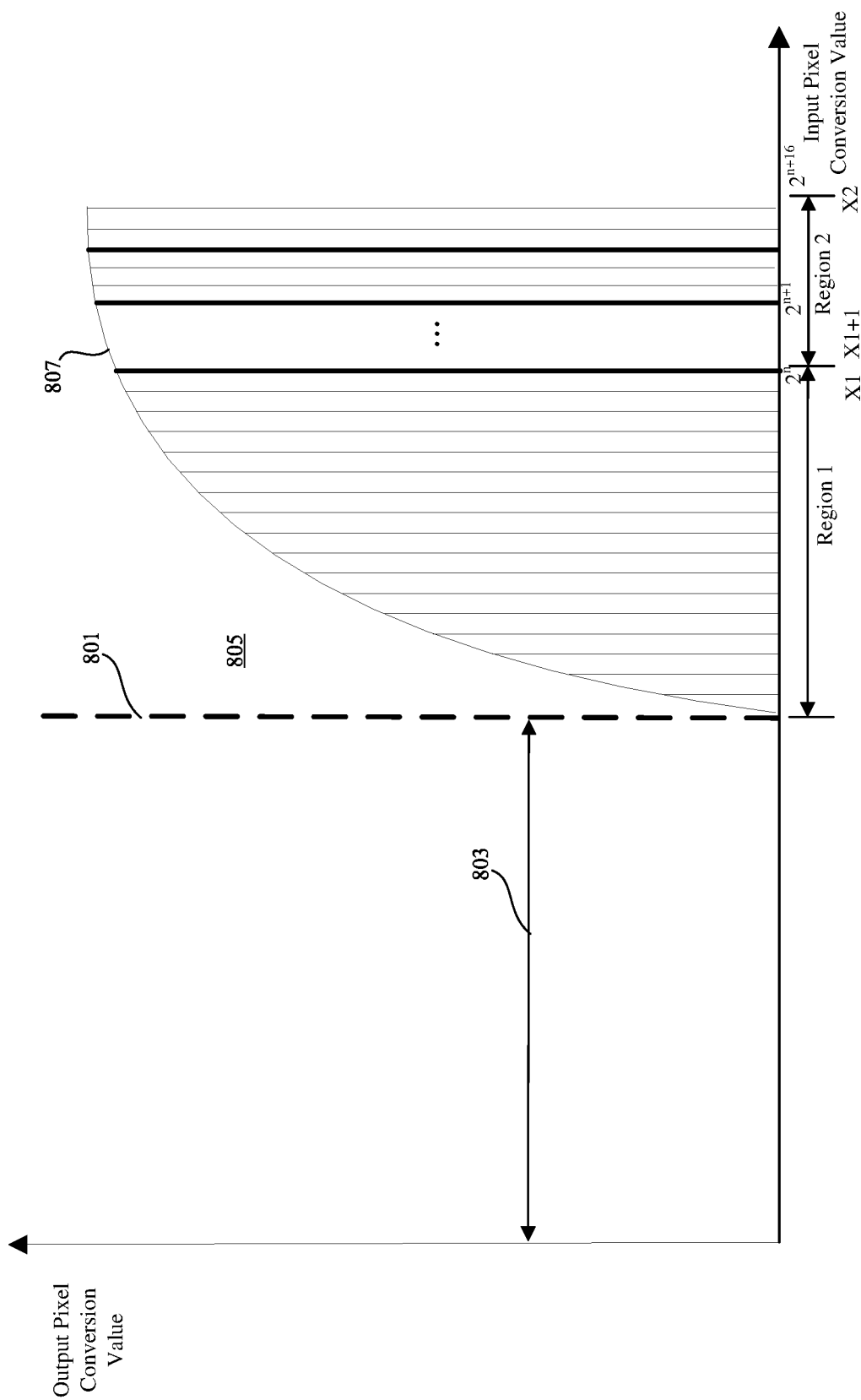

As shown in FIG. 8B, the first portion 807 of the transformed third type of color conversion function 807 is divided into Region 1 and Region 2. Similar to the first type of color conversion function 601, Region 1 may have n points where n is a positive natural number. In contrast, the sub-regions of Region 2 are divided using a power function (e.g., power of 2). The first sub-region of Region 2 is between points $2^n$ and $2^{n+1}$, the second sub-region of Region 2 is between points $2^{n+1}$ and $2^{n+2}$, the third sub region of Region 2 is between points $2^{n+2}$ and $2^{n+3}$ and so on. As shown in FIG. 8B, each sub-region in Region 2 has the same number of input pixel conversion values. In this example, each sub-region has $2^m$ points where m is 2. However, m can any natural number greater than zero. Furthermore, in other embodiments the number of points in each sub-region is configurable such that the number of points in each sub-region are different from each other. For example, the first sub-region in Region 2 may have two points whereas the second sub-region in Region 2 may have four points.

In one embodiment, the mapping values for the second portion 809 of the third type of color conversion function 805 are not stored in the LUT 507. The second color space converter 505 may derive the mapping values for the second portion 809 of the third type of color conversion function 805 during HDR color conversion from the mapping values for the first portion 807 that are stored in LUT 507. In one embodiment, the HDR circuit 503 derives the mapping values for the second portion 809 by mirroring the mapping values in the LUT 507 for the first portion 807 of the third type of color conversion function as the mapping values for the second portion 807 of the third type of color conversion function 805.

For example, the input pixel correction value and output pixel conversion value of point 801 of portion 807 of the third type of color conversion function 807 is the first value stored in the LUT 507. Point 801 has an offset input pixel conversion value 803 from zero. In one embodiment, the second color space converter 505 derives the output pixel conversion values for any input pixel conversion values of the image 503 that fall within the second portion 809 of the third type of color conversion function 807 using the mapping values stored in LUT 507 and the offset input pixel conversion value 803.

For example, the second color space converter 505 derives the value of the first input pixel conversion value for portion 807 by mirroring the value of the first input pixel conversion value for portion 807 in the negative direction from point 801. If the second input pixel conversion value for the first portion 807 is the sum of the offset input pixel conversion value 803 and a value "X", the first input pixel conversion value for the second portion 809 is derived as the absolute value of the difference of the value "X" and the offset input pixel conversion value 803. Since the first and second portions 807 and 809 have symmetrical properties, the second output pixel conversion value for the second portion 809 has the same output pixel conversion value as the second output pixel conversion value for the second portion 807. The second color space converter 505 derives the remaining input pixel conversion values and output pixel conversion values for the second portion 907 in a similar manner.

In one embodiment, the second color space converter 505 performs color conversion during the third mode of the HDR circuit 403 in the same manner as described above with respect to the first and second modes of the HDR circuit 403. That is, for each pixel in the converted image data 503 having an input image pixel value in Region 1 of the third type of color conversion function 805, the second color space converter 505 accesses the LUT 507 to identify the output pixel conversion value that maps to the input image pixel value of the image. For each pixel in the converted image data 503 having an input image pixel value in Region 2 of the third type of color conversion function 805, the second color space converter 505 accesses the LUT 507 to identify whether the LUT 507 includes an output pixel conversion value that corresponds to the input image pixel value. Responsive to the LUT 507 storing an output pixel conversion value that corresponds to the input image pixel value in Region 2, the second color space converter 505 performs the necessary conversion by fetching the output pixel conversion value that corresponds to the input image pixel value from the LUT 507. However, if the LUT 507 does not store an output pixel conversion value for the input image pixel value from Region 2 of the third type of color conversion function 805, the second color space converter 505 performs linear interpolation as described above. For any input image pixel values of the image 503 that do not map to mapping values in the LUT 507, the second color space converter 505 derives the points of the other half of the third type of color conversion function 807 from the mapping values stored in the LUT as described above.

Figure 9A:
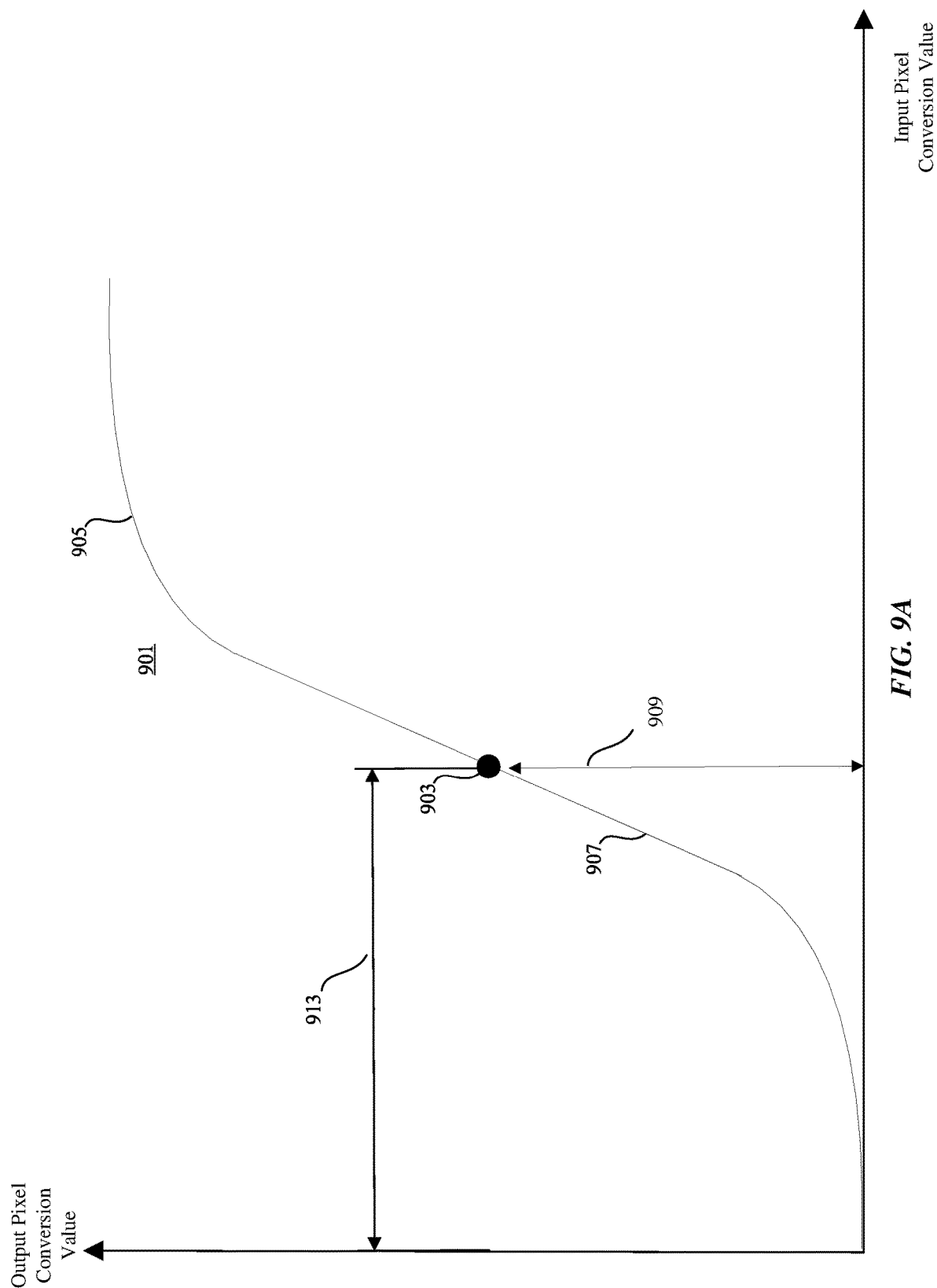
FIGS. 9A and 9B are diagrams of a fourth type of color conversion function, according to one embodiment.

FIG. 9A illustrates a fourth type of color conversion function 901 used in a fourth mode of the HDR circuit 403 for HDR color conversion. The fourth type of color conversion function 901 is characterized as having output pixel conversion values that are symmetrical about a point 903 in the X- and Y-directions. An example of the fourth type of color conversion function 901 is a S-curve.

As shown in FIG. 9A, the fourth type of color conversion function 901 is symmetrical across the point 903. The point 903 has a magnitude of offset 909 from zero in the Y-direction and a magnitude of offset 913 in the X-direction. In one embodiment, fourth type of color conversion function 901 includes a first portion 905 above the point 903 and a second portion 907 under the point 903. The first portion 905 of the fourth type of color conversion function 901 that is above the point 903 is similar to the first type of color conversion function 601. That is, the output pixel correction values of the first portion 905 of the fourth type of color conversion function 905 are already arranged from dense to sparse similar to the first type of color conversion function 601. Thus, the output pixel correction values (e.g., the mapping values) of the portion 905 are stored in the LUT 507 without requiring any transformation. The output pixel correction values of the portion 907 are not stored in LUT 507 and are instead derived from the mapping values stored in the LUT 507 during the fourth mode of the HDR circuit 404.

Figure 9B:
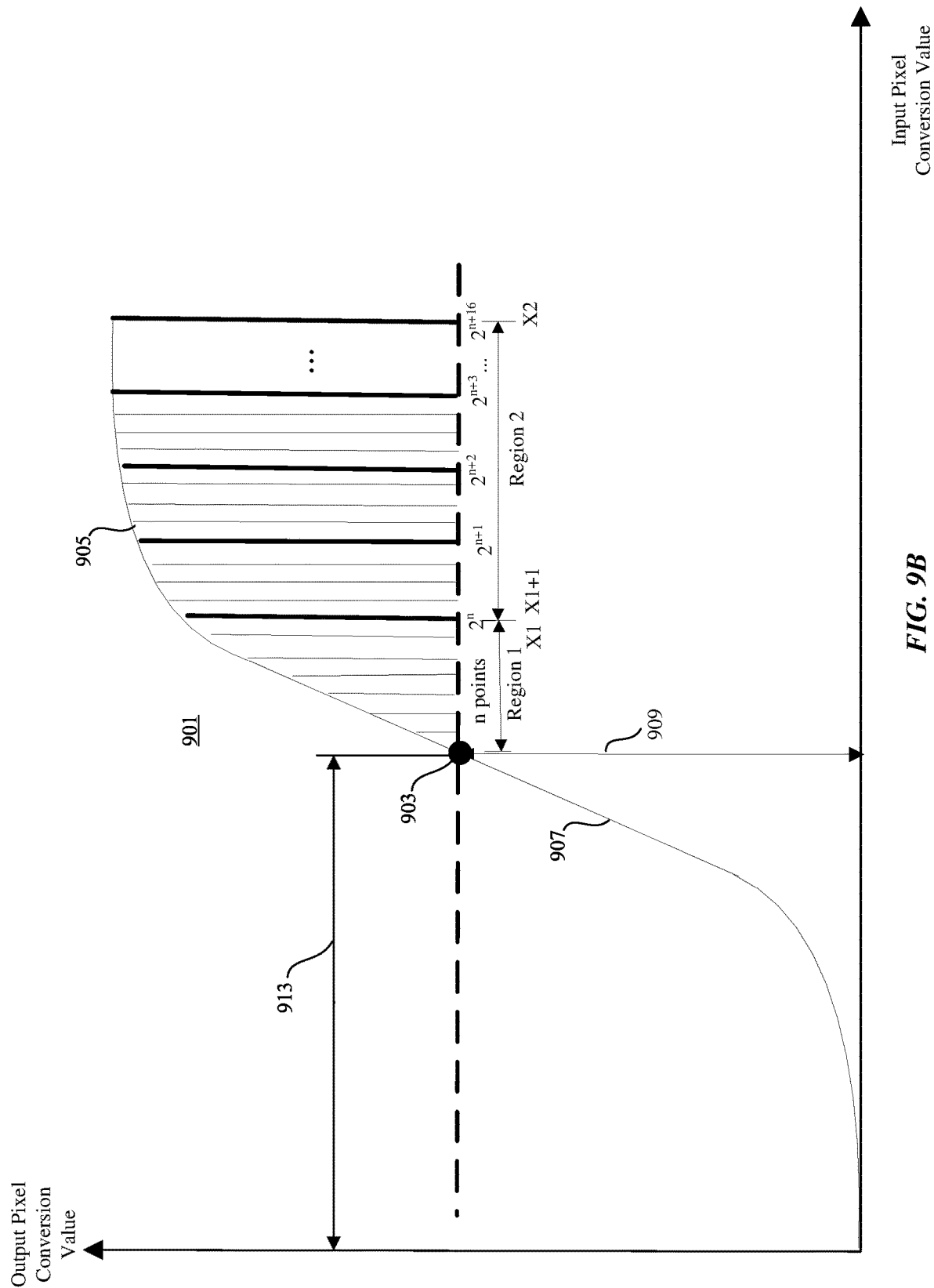

Referring to FIG. 9B, the portion 905 of the fourth type of color conversion function 905 is divided into Region 1 and Region 2. Similar to the first type of color conversion function, Region 1 may have n points where n is a positive natural number. In contrast, the sub-regions of Region 2 are divided using a power function (e.g., power of 2). The first sub-region of Region 2 is between points $2^n$ and $2^{n+1}$, the second sub-region of Region 2 is between points $2^{n+1}$ and $2^{n+2}$, the third sub region of Region 2 is between points $2^{n+2}$ and $2^{n+3}$ and so on. As shown in FIG. 9B, each sub-region in Region 2 has the same number of input pixel conversion values. In this example, each sub-region has $2^m$ points where m is 2. However, m can any natural number greater than zero. Furthermore, in other embodiments the number of points in each sub-region is configurable such that the number of points in each sub-region are different from each other. For example, the first sub-region in Region 2 may have two points whereas the second sub-region in Region 2 may have four points.

In one embodiment, the LUT 507 stores a mapping of output pixel conversion values for all input image pixel values in Region 1 of the fourth type of color conversion function 901 for the fourth mode of the HDR circuit 403 as described above with respect to the first type of color conversion function 601. For each pixel in the converted image data 503 having an input image pixel value in Region 1 of the color conversion function, the second color space converter 505 accesses the LUT 507 to identify the output pixel conversion value that maps to the input image pixel value of the image. The output pixel conversion value that maps to the input image pixel value is a color converted version of the input image pixel value.

The LUT 507 also stores mapping values for input image pixel values in Region 2 of the fourth type of color conversion function 901. However, unlike for Region 1 of the fourth type of color conversion function 905, the LUT 507 stores output pixel conversion values for a subset of all possible input pixel conversion values in Region 2 of the color conversion function. The portion of the LUT 507 corresponding to Region 2 of the color conversion function may have input pixel conversion values spaced apart by a power of two and their corresponding output pixel conversion values. That is, adjacent ones of the subset of input pixel values in Region 2 have intervals of power of two. In contrast, LUT 507 stores for Region 1 of the color conversion function each input pixel conversion value in Region 1 and its corresponding output pixel conversion value as described above.

For each pixel in the converted image data 403 having an input image pixel value in Region 2 of the fourth type of color conversion function 905, the second color space converter 505 accesses the LUT 507 to identify whether the LUT 507 includes an output pixel conversion value that corresponds to the input image pixel value. Responsive to the LUT 507 storing an output pixel conversion value that corresponds to the input image pixel value in Region 2, the second color space converter 505 performs the necessary conversion by fetching the output pixel conversion value that corresponds to the input image pixel value from the LUT 607. However, if the LUT 507 does not store an output pixel conversion value for the input image pixel value from Region 2 of the color conversion function, additional interpolation is required. Thus, the second color space converter 505 performs interpolation to determine the output pixel conversion value as previously described above.

In one embodiment, LUT 507 does not store mapping values for the second portion 907 of the fourth type of color conversion function 901. Rather, the second color space converter 505 derives the mapping values for any input pixel conversion values of the image 503 that fall within the second portion 907 of the fourth type of color conversion function 901 from the mapping values stored in the LUT 507 for the first portion 905 of the fourth type of color conversion function 901. In one embodiment, the second color space converter 505 derives the input and output pixel conversion values for the second portion 907 by mirroring the input and output pixel conversion values in the LUT 507 for the second portion 905 of the fourth type of color conversion function 905 in the negative direction across the offset point 903.

For example, the input pixel correction value and output pixel conversion value of point 903 of portion 905 of the fourth type of color conversion function 901 is the first value stored in the LUT 507. Point 903 has an offset input pixel conversion value 913 from zero in the X-direction and an offset output pixel conversion value 909 from zero in the Y-direction. In one embodiment, the second color space converter 505 derives the output pixel conversion values for any input pixel conversion values of the image 503 that fall within the portion 907 of the fourth type of color conversion function 901 using the sampling values for portion 905 and the offset input pixel conversion value 913 and the offset output pixel conversion value 909.

In one embodiment, the second color space converter 505 derives the value of the first input pixel conversion value for portion 907 by mirroring the value of the first input pixel conversion value for portion 905 in the negative direction from point 903. For example, if the first input pixel conversion value for portion 905 is the sum of the offset input pixel conversion value 913 and a value "X", the first input pixel conversion value for the portion 907 is the absolute value of the difference of the value "X" and the offset input pixel conversion value 913. The second color space converter 505 derives the remaining input pixel conversion values for portion 907 in a similar manner.

The second color space converter 505 similarly derives the value of the first output pixel conversion value for portion 907 by mirroring the value of the first output pixel conversion value for portion 905 in the negative direction from point 903. If the first output pixel conversion value for portion 905 is the sum of the offset output pixel conversion value 909 and a value "Y", the first output pixel conversion value for the portion 907 is the difference of the offset output pixel conversion value 909 and the value "Y". The second color space converter 505 derives the remaining output pixel conversion values for portion 907 in a similar manner.

In one embodiment, the second color space converter 505 performs color conversion during the fourth mode of the HDR circuit 403 in the same manner as described above with respect to the first, second, and third modes of the HDR circuit 403. That is, for each pixel in the converted image data 503 having an input image pixel value in Region 1 of the fourth type of color conversion function 901, the second color space converter 505 accesses the LUT 507 to identify the output pixel conversion value that maps to the input image pixel value of the image. For each pixel in the converted image data 503 having an input image pixel value in Region 2 of the fourth type of color conversion function 901, the second color space converter 505 accesses the LUT 507 to identify whether the LUT 507 includes an output pixel conversion value that corresponds to the input image pixel value. Responsive to the LUT 507 storing an output pixel conversion value that corresponds to the input image pixel value in Region 2, the second color space converter 505 performs the necessary conversion by fetching the output pixel conversion value that corresponds to the input image pixel value from the LUT 507. However, if the LUT 507 does not store an output pixel conversion value for the input image pixel value from Region 2 of the fourth type of color conversion function 901, the second color space converter 505 performs linear interpolation as described above. For any input image pixel values of the image 503 that do not map to points in the LUT 507, the second color space converter 505 derives the points of the other half of the fourth type of color conversion function 901 from the points stored in the LUT to perform color conversion as described above.

Referring back to FIG. 5, when the second color space converter 505 converts the input image pixel values for the converted image data 503 into converted image data 517, the second color space converter 505 outputs the converted image data 517 to a third color space converter 515. The third color space converter 515 converts the converted image data 517 into another color space format. In one embodiment, the third color space converter 515 converts the converted image data 517 into the ICTCP color space which complies with the BT.2100 standard for HDR display. After conversion, the third color space converter 515 outputs the converted image data 413 in the ICTCP color space.

Figure 10:
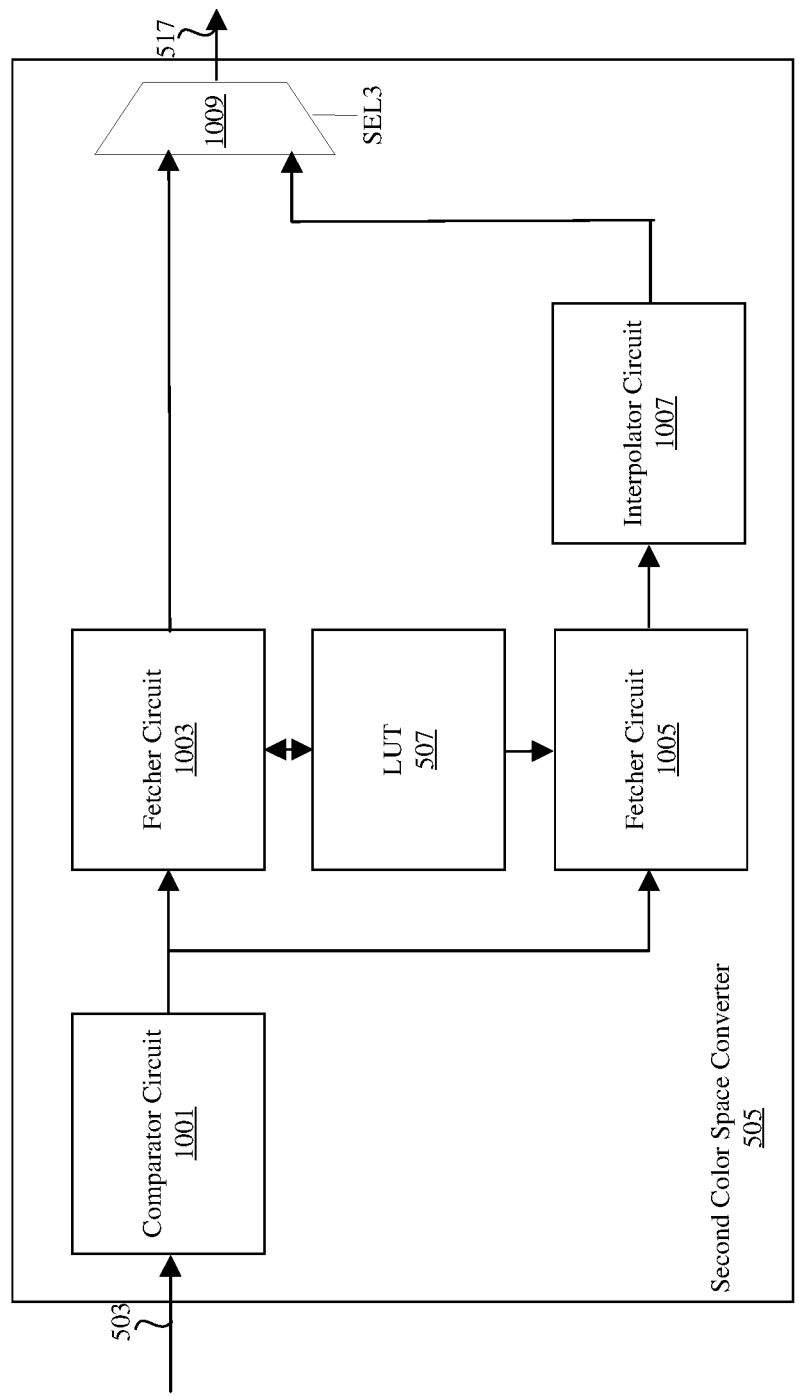
FIG. 10 is detailed block diagram of a color space converter included in the HDR circuit, according to one embodiment.

FIG. 10 is detailed block diagram of the second color space converter 505, according to one embodiment. In addition to the registers and LUT 507 shown in FIG. 5, the second color space converter 505 includes a comparator circuit 1001, a fetcher circuit 1003, a fetcher circuit 1005, an interpolator circuit 1007, and a multiplexor 10009 in one embodiment. The comparator circuit 1001 receives the converted image data 503 and determines for each input image pixel value in the converted image data 503 whether the input image pixel value is in Region 1 or Region 2 of the color conversion function. As described above the color conversion function being used for HDR color conversion is selected based on the mode value stored in the mode register 509. The set of values (e.g., the input pixel conversion values and the output pixel conversion values) of the selected mode are loaded into LUT 507.

In one embodiment, the comparator circuit 1001 determines whether each input image pixel value is above or below a pixel value threshold where the pixel value threshold corresponds to the last pixel value in Region 1 of the color conversion function. If the input image pixel value is less than or equal to the pixel value threshold, the input image pixel value is within Region 1 of the color conversion function and the comparator circuit 1001 provides the input image pixel value to fetcher circuit 1003.

Fetcher circuit 1003 bypasses the interpolator 1007 and fetches from the LUT 507 the output pixel conversion value corresponding to the input image pixel value that is in Region 1 of the color conversion function. The fetcher circuit 1003 provides the output pixel conversion value fetched from the LUT 507 or derived from the output pixel conversion value fetched from LUT 507 to multiplexor 1009 which outputs the converted image data 413 using the fetched output pixel conversion value according to a selection signal SEL3 that is set based on whether the comparator circuit 1001 determines that the input image pixel value is in Region 1 or Region 2 of the color conversion function.

If the input image pixel value is greater than the pixel value threshold, the input image pixel value is within Region 2 of the color conversion function and the comparator circuit 1001 provides the input image pixel value to fetcher circuit 1005. The fetcher circuit 1005 determines whether the input image pixel value is indexed (e.g., mapped) to a corresponding output pixel conversion value within Region 2 of the color conversion function. If the input image pixel value is indexed to a corresponding output pixel conversion value in the LUT 507 or can be derived from the output pixel conversion value in LUT 507, the fetcher circuit 805 fetches or derives the output pixel conversion value and provides the fetched output pixel conversion value to the multiplexor 1009 through interpolator circuit 1007 without the interpolator 1007 performing interpolation.

In one embodiment, during the third and fourth modes of the HDR circuit 403, the determination of whether the input image pixel value is indexed to a corresponding output pixel conversion value within Region 1 or Region 2 of the color conversion function includes the fetcher circuit 1005 deriving the input pixel conversion values and output pixel conversion values for symmetrical portions of the color conversion functions as not all of the input pixel conversion values and output pixel conversion values are stored in LUT 507 as described above. The fetcher circuit 1005 determines whether the input image pixel value is indexed to a corresponding output pixel conversion value that is derived by the fetcher circuit 1005 based on the values stored in LUT 507.

However, if the input image pixel value within Region 2 of the color conversion function does not index to a corresponding output pixel conversion value in the LUT 507, the fetcher circuit 1005 fetches from the LUT 507 a pair of input pixel conversion values (derived or stored in LUT 507) that bound the input image value and their corresponding output pixel conversion values. In one embodiment, the fetcher circuit 1005 first determines the sub-region of Region 2 of the color conversion function that includes the input image pixel value. Given that Region 2 is divided into sub-regions based on a power of 2 function, the fetcher circuit 805 can identify the sub-region that includes the input image pixel value based on the leading edge of digital representation of the input image pixel value.

Consider the example where the input image pixel value is 14. The digital representation of 14 is "00001110" assuming an 8-bit format. The leading edge (e.g., most significant bit with a value of 1) is in the $3^{rd}$ position indicating that the input image pixel value of 14 is in the third sub-region of Region 2. In one embodiment, the values in the digital representation of the input image pixel value after the leading edge indicate the points within the identified sub-region that are used to interpolate the output image pixel conversion value for the input image pixel value. For example, the remaining values of "110" indicate the first and second points within the third-sub region are used for interpolation.

The fetcher circuit 1005 outputs the fetched output pixel conversion values and input pixel conversion values from LUT 507 to interpolator 1007. The interpolator circuit 1007 performs linear interpolation using the fetched output pixel conversion values and the fetched input pixel conversion values to calculate the output image pixel value for the input image pixel value. The interpolator circuit 1007 provides the calculated output image pixel value to multiplexor 1009 which outputs the converted image data 413 using the fetched output image pixel value according to the selection signal SEL3.

Example Process for Performing Color Conversion

Figure 11:
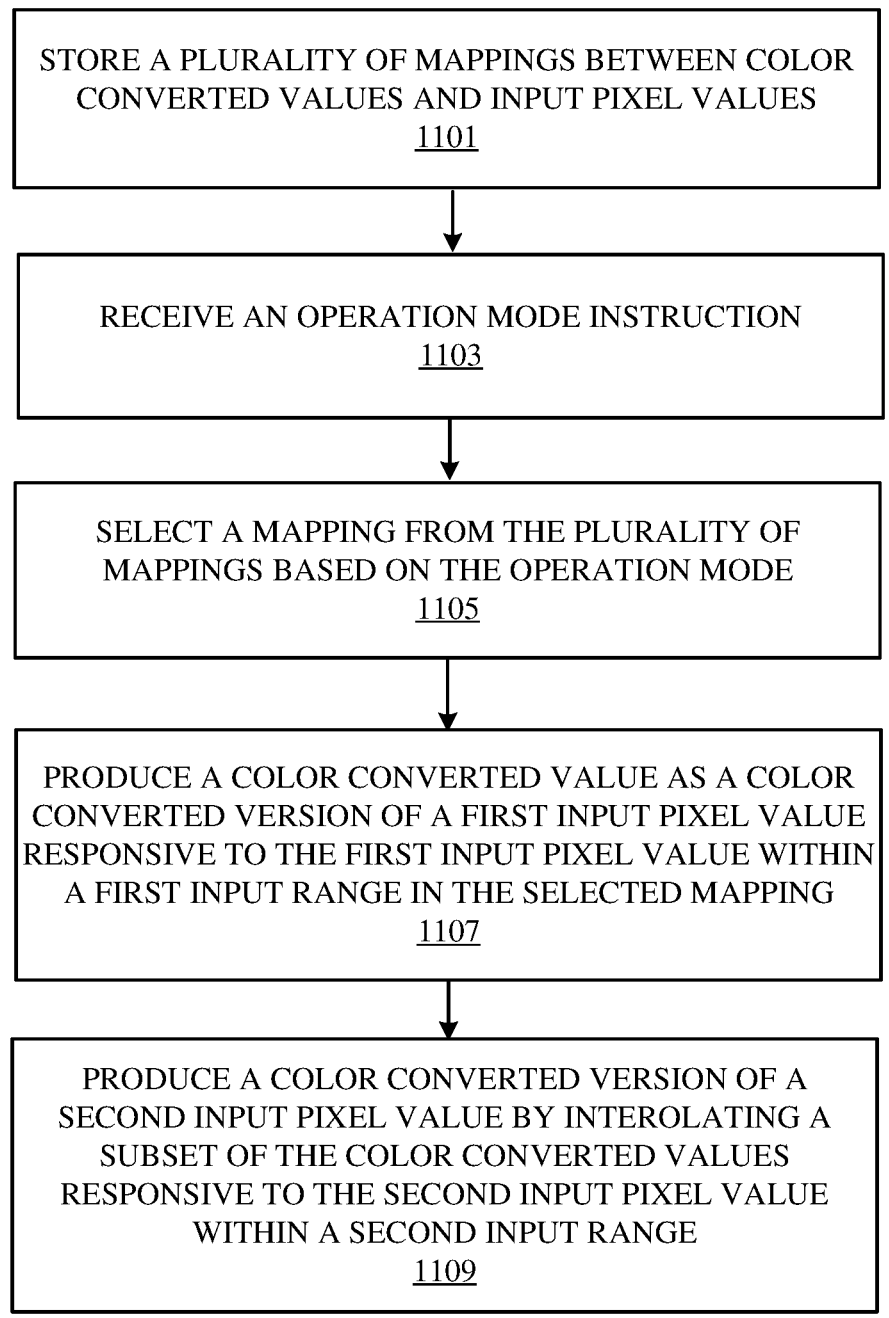
FIG. 11 is a flowchart illustrating a method of converting pixel values using a color conversion function, according to one embodiment.

FIG. 11 is a flowchart illustrating a method of pixel conversion, according to one embodiment. The method may include additional or fewer steps, and steps may be performed in different orders. The method may be performed by HDR circuit 403 of FIG. 4. The HDR circuit 403 stores 1101 a plurality of mappings between color converted values and input pixel values. Each mapping is associated with a different color conversion function that may be used for HDR color conversion. The HDR circuit 403 operates in different operation modes where each operation mode uses a different color conversion function for HDR color conversion. The different color conversion functions may include a Gamma function, a log 2 function, a power function with an exponent less than 1, a bell-shaped function, an inverse S-curve function, or a S-curve function.

The HDR circuit 403 receives 1103 an operation mode instruction that specifies the mode of operation of the HDR circuit 403. The instruction includes a mode value that is stored in the mode register 509. As mentioned above, the mode value specifies the operation mode of the HDR circuit 403 where the operation mode corresponds to a specific color conversion function from among the multiple color conversion functions.

The HDR circuit 403 selects 1105 a mapping from the plurality of mappings based on the operation mode of the HDR circuit 403. The selected mapping is loaded into the LUT 507. The HDR circuit 403 produces 1107 a color converted value as a color converted version of a first input pixel value of an image responsive to the first input pixel value being within a first input range of the color conversion function. The HDR circuit 403 produces 1109 a color converted version of a second input pixel value of the image by interpolating a subset of the color converted values received from the LUT 507 responsive to the second input pixel value within a second input range of the color conversion function. In one embodiment, the second input range distinct from the first input range.

While the embodiments herein are described with respect to HDR processing, the principles used for HDR color conversion are applicable to other types of processing that convert data from one format to another. The principles can be applied to other types of image processing or other technology such as sound processing.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A color conversion circuit, comprising:
a mode register configured to store a mode value indicating a mode selected from a plurality of operation modes, each of the plurality of operation modes using a different color conversion function;
a lookup table memory circuit configured to store a mapping between color converted values and input pixel values as indicated by the selected operation mode;
a first fetcher circuit coupled to the lookup table memory circuit and configured to produce one of the color converted values received from the lookup table memory circuit as a color converted version of an input pixel value, responsive to the input pixel value being within a first input range of the color conversion function; and
an interpolator circuit coupled to the lookup table memory circuit and configured to produce the color converted version of the input pixel value by interpolating a subset of the color converted values received from the lookup table memory circuit, responsive to the input pixel value being within a second input range of the color conversion function, the second input range distinct from the first input range.

2. The color conversion circuit of claim 1, wherein a color conversion function in at least one of the plurality of operation modes is symmetric with respect to an axis or point, and wherein the lookup table memory circuit is configured to store the color converted values at one side of the axis or point but not store the color converted values at an opposite side of the axis or point.

3. The color conversion circuit of claim 2, wherein the first fetcher circuit is further configured to derive color converted values for input pixel values within the first input range of the color conversion function at the opposite side of the axis or point from the color converted values within the first input range of the color conversion function at the one side of the axis or the point that are stored in the lookup table memory circuit responsive to the selected mode representing the color conversion function that is symmetric with respect to the axis or point.

4. The color conversion circuit of claim 3, wherein the second fetcher circuit is further configured to derive color converted values for input pixel values within the second input range of the color conversion function at the opposite side of the axis or point from the color converted values within the second input range of the color conversion function at the one side of the axis or the point that are stored in the lookup table memory circuit responsive to the selected mode representing the color conversion function that is symmetric with respect to the axis or point.

5. The color conversion circuit of claim 4, further comprising a comparator circuit coupled to the first fetcher circuit and second fetcher circuit and configured to:
- determine whether the input pixel value is in the first input range or the second input range;
- provide the input pixel value to the first fetcher circuit responsive to determining that the input pixel value is in the first input range; and
- provide the input pixel value as the second input pixel value to the second fetcher circuit responsive to determining that the input pixel value is in the second input range.

6. The color correction circuit of claim 1, wherein a number of input pixel values and corresponding output pixel values in the first input range that are stored in the lookup table memory circuit is configurable to be either greater than or less than a number of input pixel values and corresponding output pixel values in the second input range that are stored in the lookup table memory circuit.

7. The color correction circuit of claim 6, wherein the second input range of the color conversion function includes a plurality of sub-input ranges, and a number of input pixel values and corresponding output pixel values stored in the lookup table memory circuit for each of the plurality of sub-input ranges is configurable.

8. The color correction circuit of claim 7, wherein the lookup table memory circuit stores a different number of input pixel values and corresponding output pixel values for at least two of the plurality of sub-input ranges.

9. The color correction circuit of claim 1, wherein responsive to a last point in the color conversion function having an index value in the lookup table memory circuit that is not a power of two, a configurable point is enabled such that the configurable point is the last point in the lookup table memory circuit for the color conversion function and has an index value that is a power of two in the lookup table memory circuit.

10. The color correction circuit of claim 9, wherein the lookup table memory circuit stores a same number of input pixel values and corresponding output pixel values for at least two of the plurality of sub-input ranges.

11. A method for pixel conversion of a color correction circuit, comprising:
- storing a mode value indicating a mode selected from a plurality of operation modes in a mode register of the color correction circuit, each of the plurality of operation modes using a different color conversion function;
- storing a mapping between color converted values and input pixel values in a lookup table memory circuit as indicated by the selected operation mode;
- producing one of the color converted values received from the lookup table memory circuit as a color converted version of an input pixel value, responsive to the input pixel value being within a first input range of the color conversion function; and
- producing the color converted version of the input pixel value by interpolating a subset of the color converted values received from the lookup table memory circuit, responsive to the input pixel value being within a second input range of the color conversion function, the second input range distinct from the first input range.

12. The method of claim 11, wherein a color conversion function in at least one of the plurality of operation modes is symmetric with respect to an axis or point, and the color converted values at one side of the axis or point is stored in the lookup table memory circuit but the color converted values at an opposite side of the axis or point is not stored in the lookup table memory circuit.

13. The method of claim 12, further comprising:
- deriving color converted values for input pixel values within the first input range of the color conversion function at the opposite side of the axis or point from the color converted values within the first input range of the color conversion function at the one side of the axis or the point that are stored in the lookup table memory circuit responsive to the selected mode representing the color conversion function that is symmetric with respect to the axis or point.

14. The method of claim 13, further comprising:
- deriving color converted values for input pixel values within the second input range of the color conversion function at the opposite side of the axis or point from the color converted values within the second input range of the color conversion function at the one side of the axis or the point that are stored in the lookup table memory circuit responsive to the selected mode representing the color conversion function that is symmetric with respect to the axis or point.

15. The method of claim 11, wherein a number of input pixel values and corresponding output pixel values in the first input range that are stored in the lookup table memory circuit is configurable to be either greater than or less than a number of input pixel values and corresponding output pixel values in the second input range that are stored in the lookup table memory circuit.

16. The method of claim 15, wherein the second input range of the color conversion function includes a plurality of sub-input ranges, and a number of input pixel values and corresponding output pixel values stored in the lookup table memory circuit for each of the plurality of sub-input ranges is configurable.

17. The method of claim 16, wherein a different number of input pixel values and corresponding output pixel values for at least two of the plurality of sub-input ranges are stored in the lookup table memory circuit.

18. The method of claim 16, wherein a same number of input pixel values and corresponding output pixel values for at least two of the plurality of sub-input ranges are stored in the lookup table memory circuit.

19. The method of claim 11, further comprising:
- responsive to a last point in the color conversion function having an index value in the lookup table memory circuit that is not a power of two, enabling a configurable point such that the configurable point is the last point in the lookup table memory circuit for the color conversion function and has an index value that is a power of two in the lookup table memory circuit.

20. A system for pixel conversion, comprising:
an image sensor configured to obtain an image; and
an image signal processor coupled to the image sensor, the image signal processor configured to perform processing of the image, the image signal processor including:
- a mode register configured to store a mode value indicating a mode selected from a plurality of operation modes, each of the plurality of operation modes using a different color conversion function;
- a lookup table memory circuit configured to store a mapping between color converted values and input pixel values as indicated by the selected operation mode;
- a first fetcher circuit coupled to the lookup table memory circuit and configured to produce one of the color converted values received from the lookup table memory circuit as a color converted version of an input pixel value, responsive to the input pixel value being within a first input range of the color conversion function; and an interpolator circuit coupled to the lookup table memory circuit and configured to produce the color converted version of the input pixel value by interpolating a subset of the color converted values received from the lookup table memory circuit, responsive to the input pixel value being within a second input range of the color conversion function, the second input range distinct from the first input range.

* * * * *